United States Patent [19]

Casterline

[11] Patent Number: 5,121,791
[45] Date of Patent: Jun. 16, 1992

[54] BARREL TYPE FLUID HEAT EXCHANGER AND MEANS AND TECHNIQUE FOR MAKING THE SAME

[76] Inventor: Richard Casterline, 14413 SE. 162nd Pl., Renton, Wash. 98058

[21] Appl. No.: 763,635

[22] Filed: Sep. 23, 1991

Related U.S. Application Data

[62] Division of Ser. No. 421,678, Oct. 16, 1989, Pat. No. 5,063,663.

[51] Int. Cl.$^5$ .......................... F28F 9/26; F28D 7/10
[52] U.S. Cl. .................................. 165/143; 165/159; 165/163
[58] Field of Search ............... 165/143, 119, 158, 159, 165/163

[56] References Cited

U.S. PATENT DOCUMENTS

| | | | |
|---|---|---|---|
| 2,256,993 | 9/1941 | VanVleet | 165/159 X |
| 2,391,244 | 12/1945 | Jackson | 165/143 X |
| 2,432,362 | 12/1947 | Worn et al. | 165/143 X |
| 2,873,098 | 2/1959 | Morgan | 165/159 |
| 3,171,477 | 3/1965 | Huet | 165/163 X |
| 3,321,013 | 5/1967 | Babylon | 165/159 X |
| 3,705,622 | 12/1972 | Schwarz | 165/143 |

FOREIGN PATENT DOCUMENTS 1408187  7/1988  U.S.S.R. ............... 165/163

*Primary Examiner*—Allen J. Flanigan
*Attorney, Agent, or Firm*—Christopher Duffy

[57] ABSTRACT

The barrel assembly of the heat exchanger is manufactured with abutment joints between the housing and the headers thereof, and is clamped together along the axis of the assembly by a rod extending through the respective headers, and the housing, parallel to the axis, so that the housing is not vulnerable to "blowing its ends" when under pressure. The housing is also free draining at the discharge header when relieved of pressure, and this combination of features is made possible in part by the use of an insertable fluid flow cartridge for the housing which provides the tubing for one of the fluids and baffling for the other fluid when the latter fluid is circulated through the housing.

25 Claims, 8 Drawing Sheets

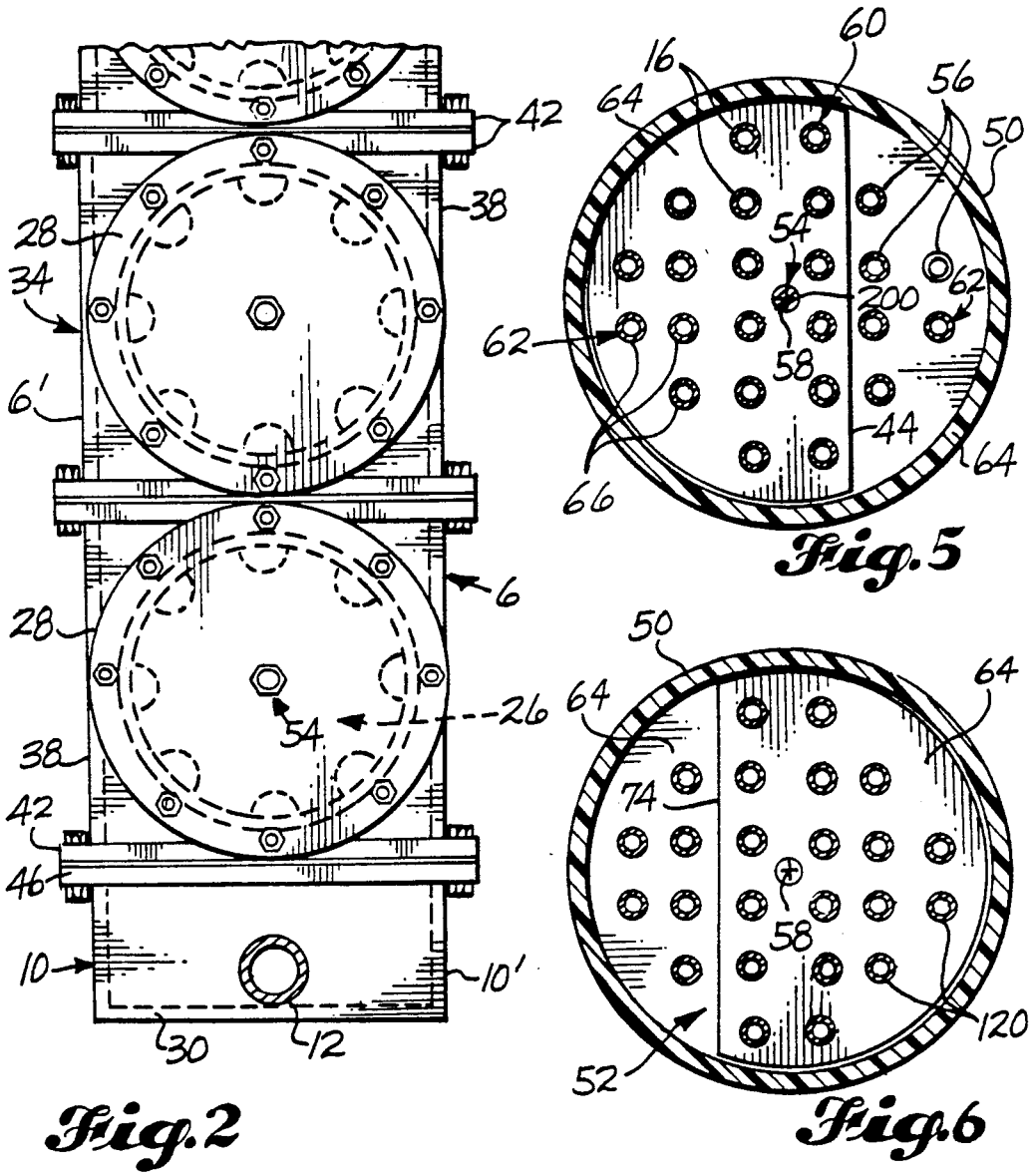

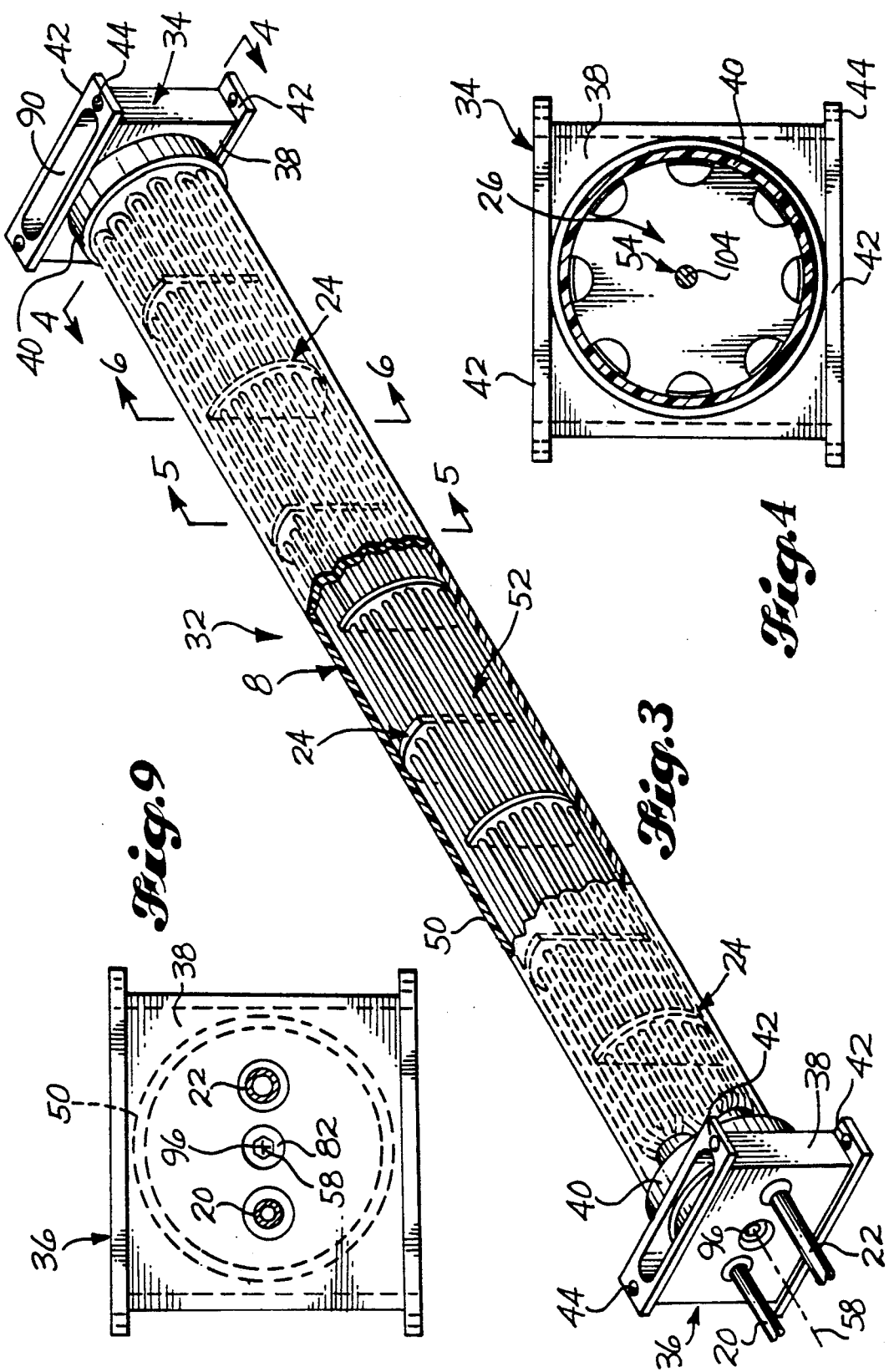

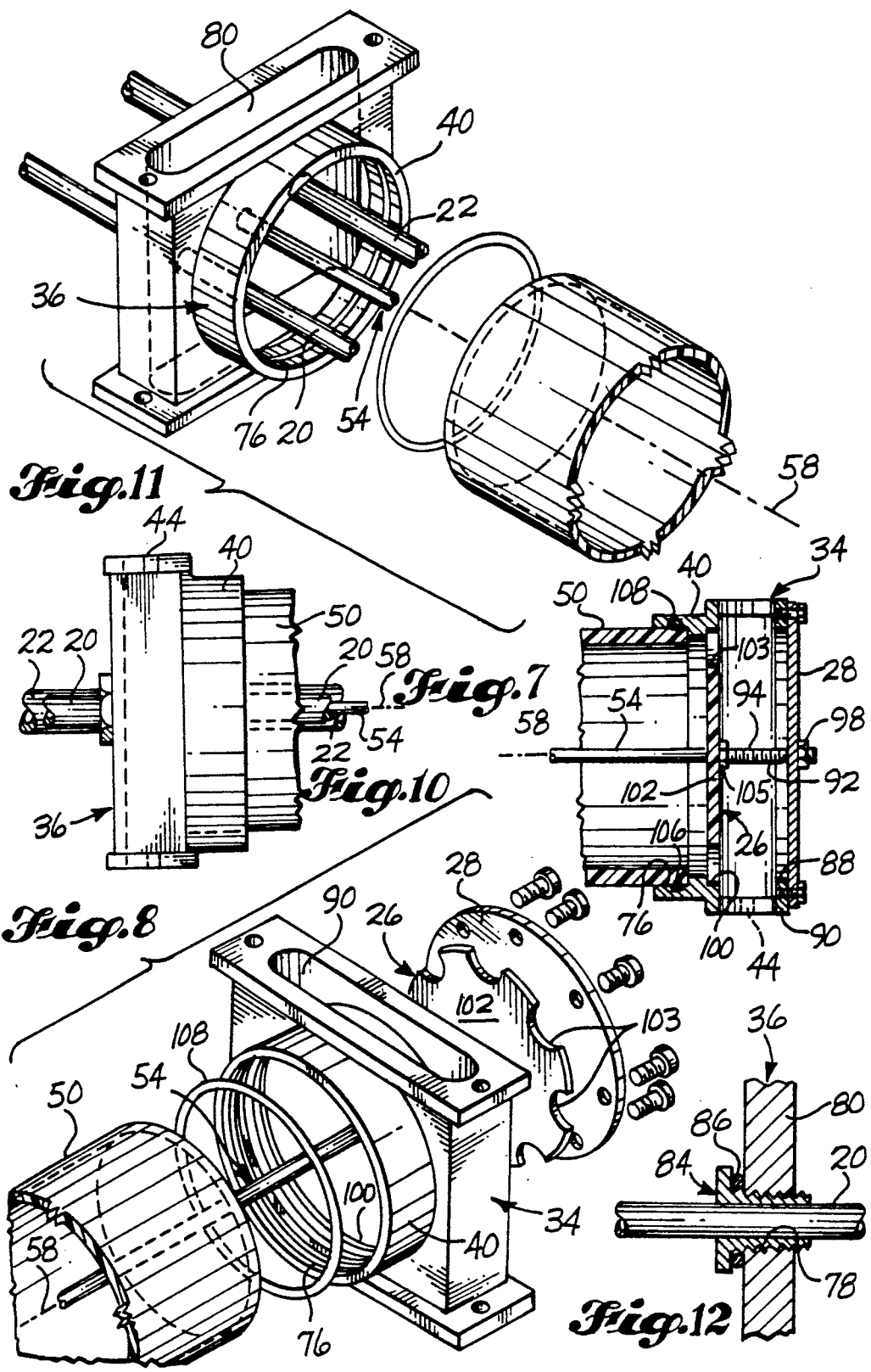

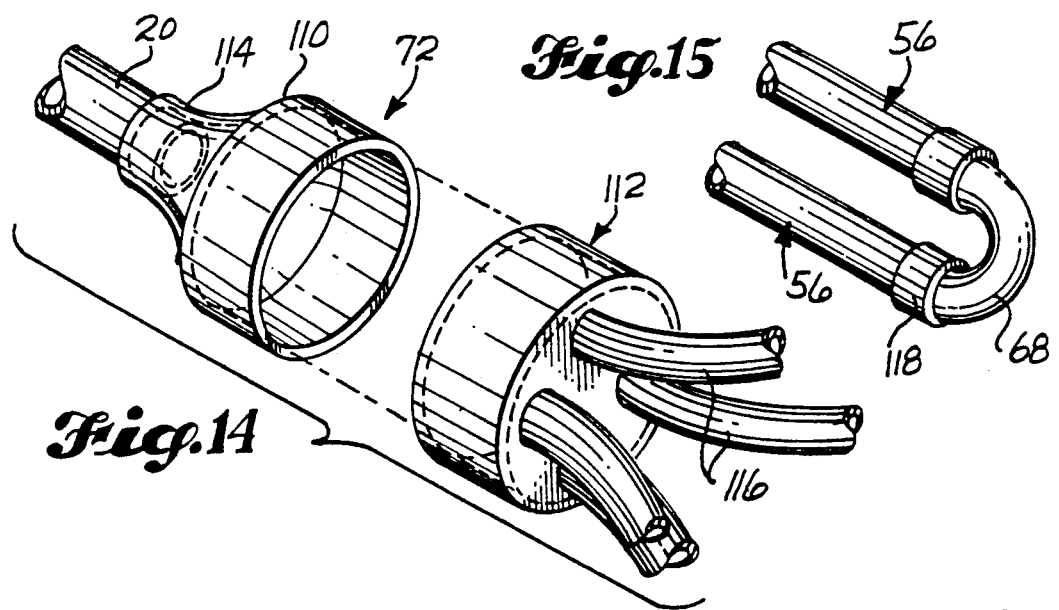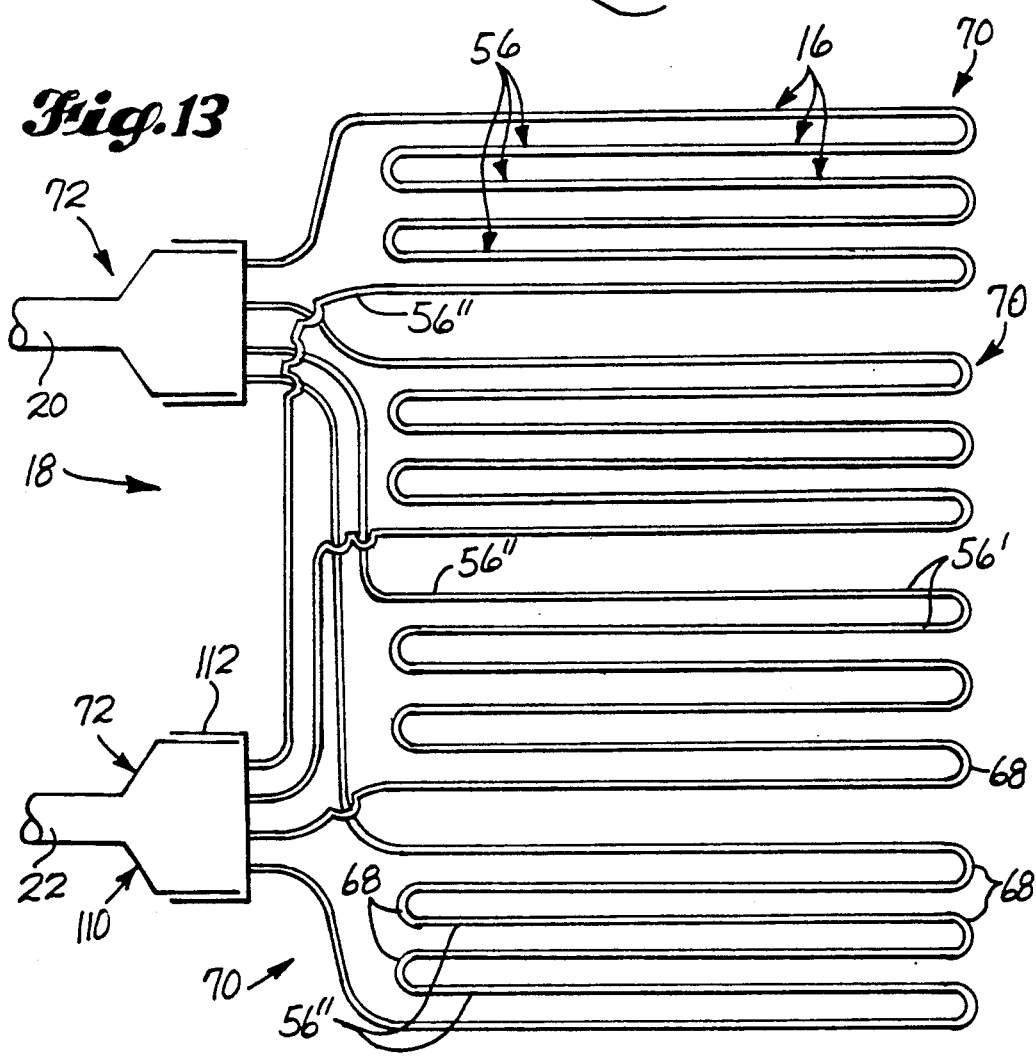

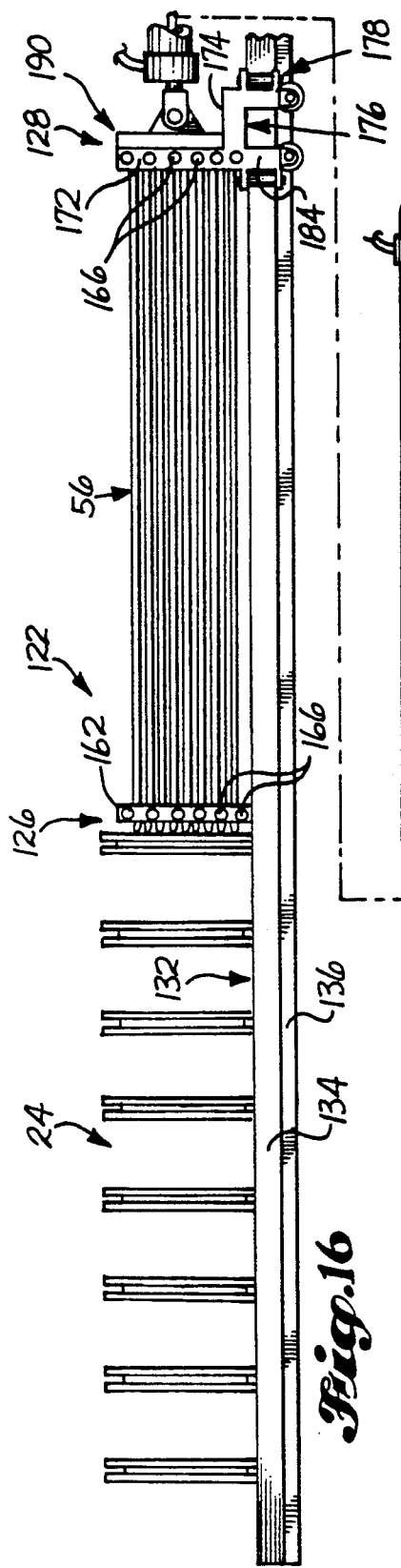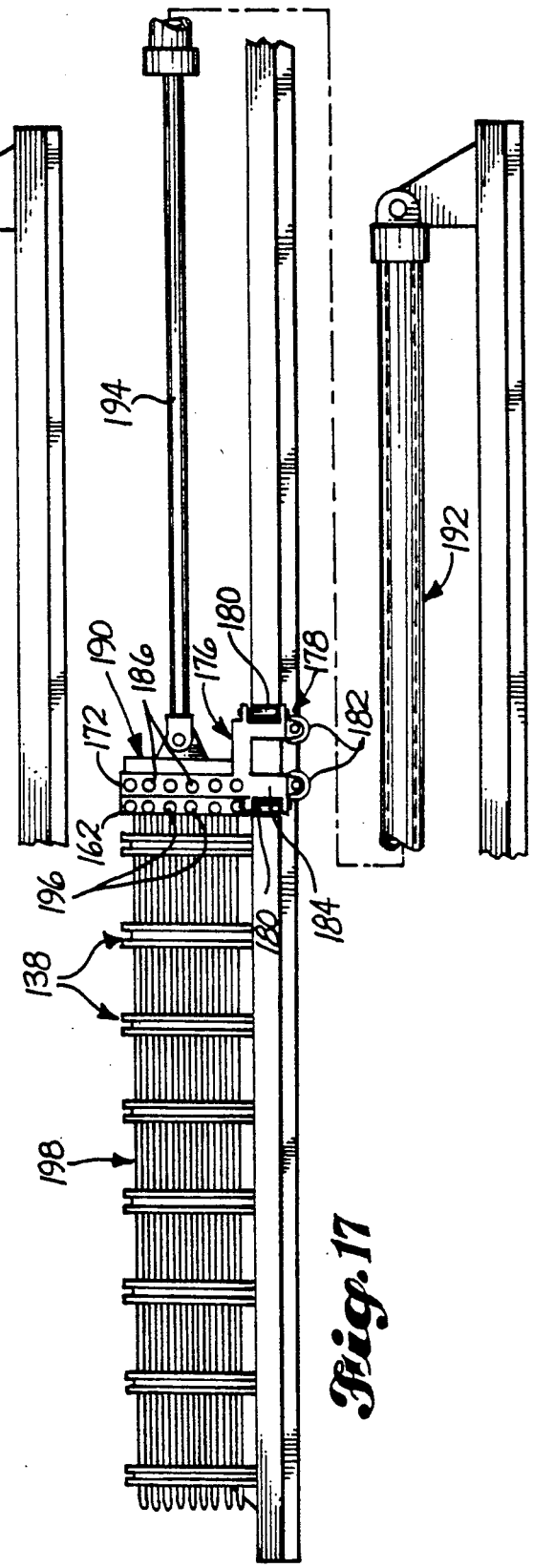

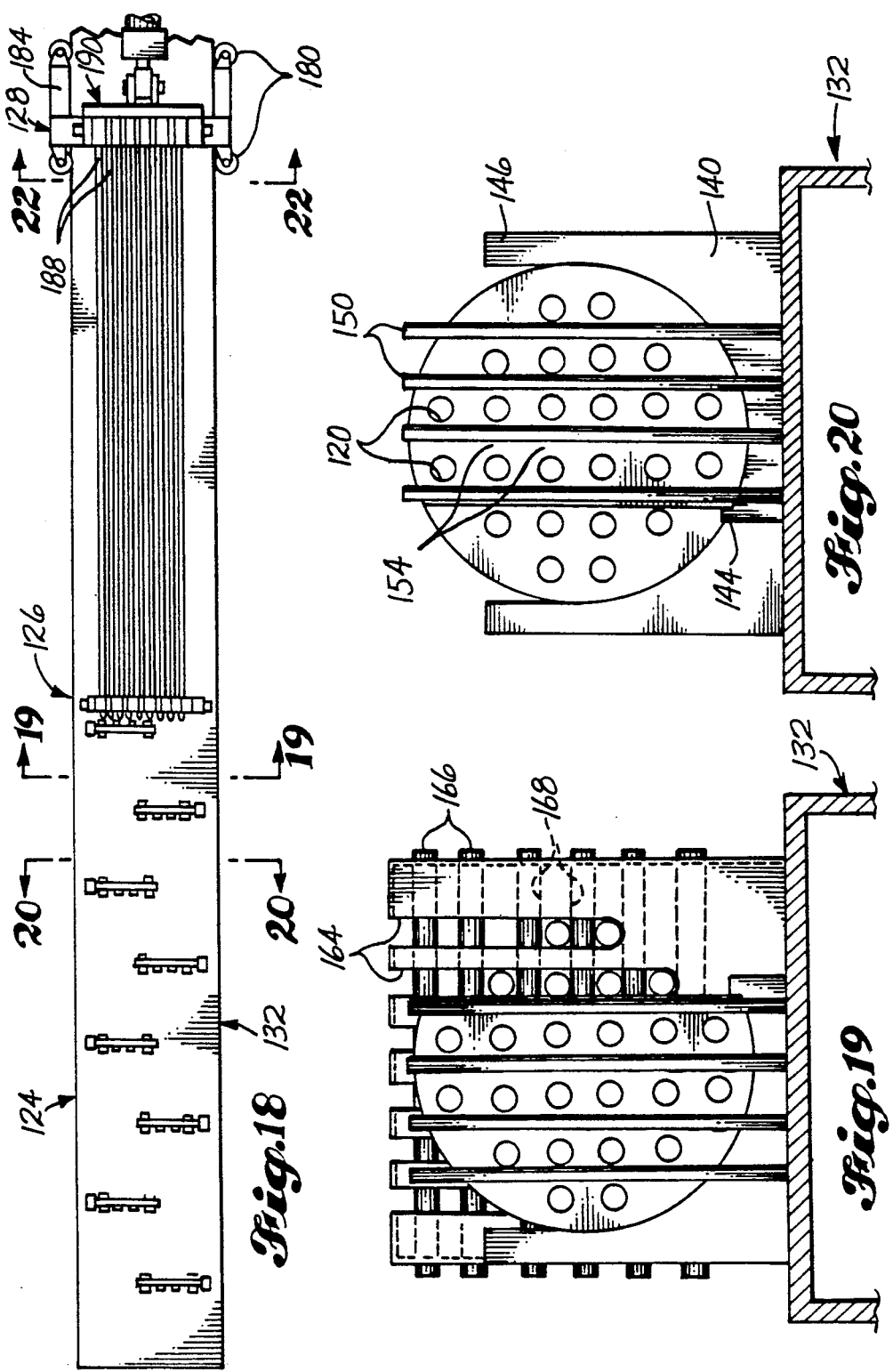

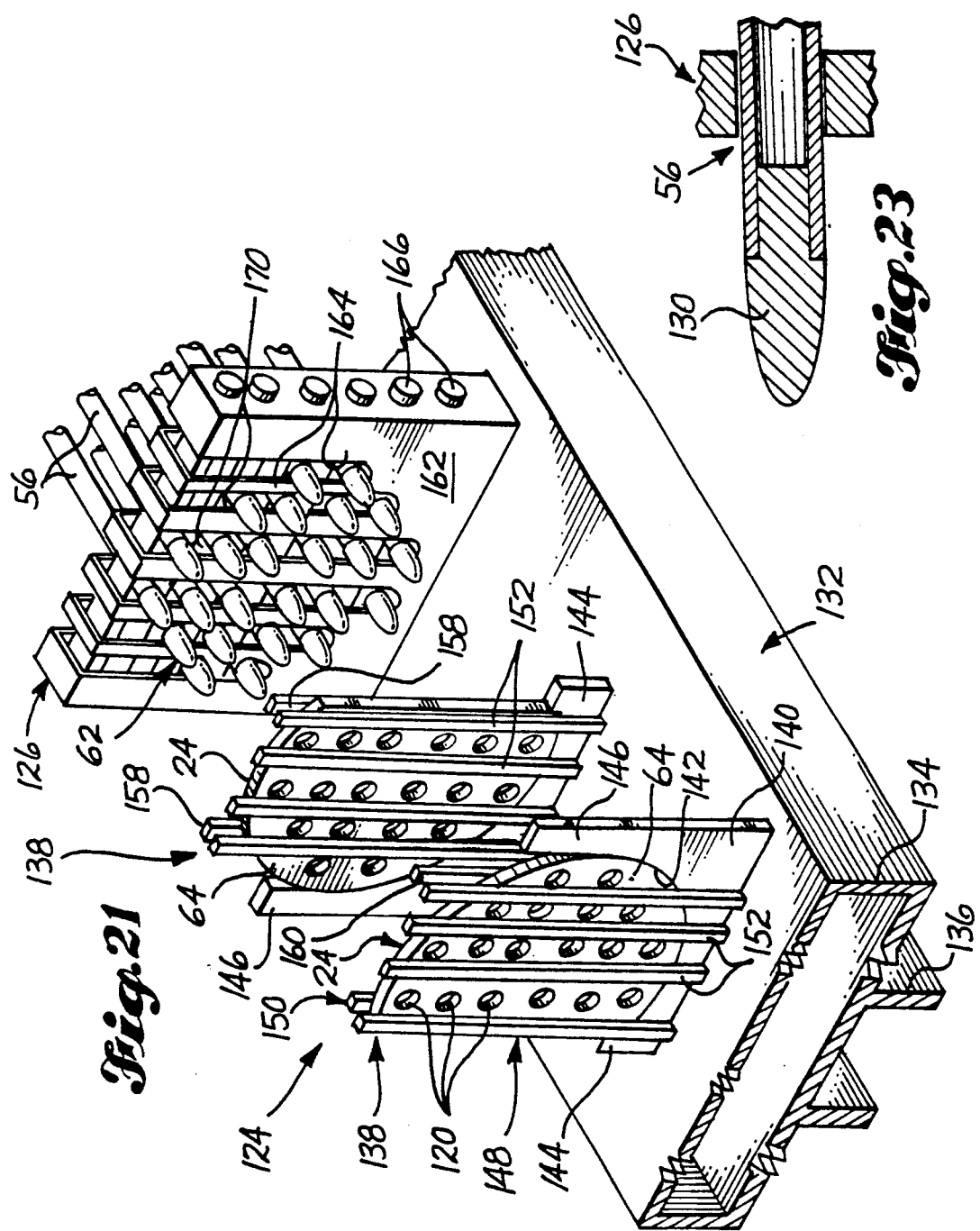

1

BARREL TYPE FLUID HEAT EXCHANGER AND MEANS AND TECHNIQUE FOR MAKING THE SAME

RELATED APPLICATION

The present application is a division of copending application Ser. No. 421,678 filed on Oct. 16, 1989 Pat. No. 50636 and having the same title.

1. Technical Field

This invention relates to a barrel type fluid heat exchanger, and a means and technique for making the same. In particular, it relates to a heat exchanger of this type wherein, because of the means and technique by which it is made, the barrel of the heat exchanger is relatively incapable of "blowing its ends" when under pressure, and at the same time, capable of fully draining when relieved of pressure.

2. Background Art

In previously disclosed fluid heat exchangers of this type, the barrel was commonly capped at its ends, and then the end caps were interconnected by hoses or the like with intake and discharge manifolds through which the barrel could be serviced with the fluid undergoing heat exchange. When under pressure, the barrel was vulnerable to losing one or the other or both of its caps, and because of the change in diameter from the barrel to the manifolds, the fluid undergoing heat exchange was often unable to fully drain from the barrel when the pressure on the barrel was relieved.

DISCLOSURE OF THE INVENTION

The barrel type fluid heat exchanger of the present invention comprises an elongated tubular housing, and means for circulating a first fluid through the housing from one end thereof to the other, including a pair of intake and discharge headers which have fluid flow passages therein and are spaced apart from one another at the aforesaid one or other ends of the housing, respectively, to form a unitary barrel assembly therewith. The headers have means thereon forming abutment joints with the adjacent ends of the housing, and the heat exchanger further comprises means for clamping the barrel assembly together at the joints. The heat exchanger also comprises a cartridge which is telescopically engaged in the housing and comprises a plurality of tubes spaced apart from one another on parallels to the longitudinal axis of the housing and having a plurality of baffles relatively impaled thereon in spaced parallel array with one another transverse the axis of the housing. The baffles have areas, transverses the axis, of less than the area circumscribed by the housing, transverse the axis, and the tubes are connected with one another in a fluid flow circuit having inlet and outlet pipes therein which are connected with the periphery of the barrel assembly so that a second fluid can be circulated through the circuit while the first fluid circulates through the housing, between the pairs of tubes and baffles of the cartridge.

In many of the presently preferred embodiments of the invention, the discharge header has an opening therein which is adapted to freely drain into the fluid flow passage thereof at one edge of the opening, and the adjacent other end of the housing is abutted with the discharge header so that the housing freely drains at the one edge of the opening therein. In some embodiments, for example, the discharge header has a nipple projecting therefrom about the opening, and the aforesaid other end of the housing is telescopically engaged in the nipple to drain into the fluid flow passage of the discharge header at the aforesaid one edge of the opening therein.

In certain of the presently preferred embodiments, moreover, the discharge header has a pair of apertures therein on the opposite side of the passage from the opening thereof, and the inlet and outlet pipes of the cartridge extend generally axially of the same at one end thereof, and are bayonetted through the opening of the discharge header, and thence through the pair of apertures, for connection of the circuit to the periphery of the barrel assembly.

Furthermore, in some embodiments, the intake header has an opening therein through which the passage thereof communicates with the one end of the housing, and an additional baffle is installed in the opening of the intake header to filter debris from the first fluid, before the fluid is introduced to the housing. In addition, in one special group of embodiments, the intake header has a hatch which is opposed to the additional baffle on the opposite side of the passage from the opening therein, so that the debris can be removed from the barrel assembly at the upstream side of the filter.

Preferably, the intake header also has a nipple projecting therefrom, about the opening therein, and the one end of the housing is telescopically engaged in the nipple so that the housing also free drains at the opening of the intake header.

In certain of the presently preferred embodiments of the invention, an elongated rod is passed through the respective headers, and through the housing, parallel to the longitudinal axis thereof, and means are provided on the opposing ends of the rod to clamp the barrel assembly together as a sandwich.

Often, the headers are adapted so that the barrel assembly can be stacked on top of another such barrel assembly to form a multi-barrel device in which there is a pair of manifolds having a plurality of barrels interconnected therebetween in the manner of a grill.

In making the device, or a barrel assembly thereof, the aforementioned housing and cartridge are reciprocated in relation to one another along the axis of the housing, to form a peripheral wall around the cartridge; and then the housing and cartridge are sandwiched between a pair of the headers, and the housing, headers, and cartridge are clamped together to form a unitary barrel assembly in which the baffles have the aforementioned areas, transverse the axis, and the inlet and outlet pipes of the cartridge are connected with the periphery of the barrel assembly so that a second fluid can be circulated through the circuit of the cartridge, while a first fluid is circulated through the housing, from one header to the other.

Once again, in some embodiments, the headers have nipples thereon, and the opposing ends of the housing are telescopically engaged in the nipples to form abutment joints with the headers at the inner peripheries of the nipples. Also, once again, in certain embodiments, an elongated rod is passed through the respective headers, and through the housing, parallel to the longitudinal axis thereof, and means are provided on the opposing ends of the rod to clamp the barrel assembly together as a sandwich.

In one special group of embodiments, the heat exchanger is manufactured by providing, initially, a bafflesupported tube assembly comprising a plurality of tubes spaced apart from one another on parallels to an axis and having a plurality of baffles relatively impaled thereon in spaced parallel array with one another transverse the axis. The tubes of the assembly are then connected with one another in a reentrant flow circuit having generally axially extending inlet and outlet flow pipes at one axial end of the assembly. With the resulting cartridge-like tube assembly then in hand, the inlet and outlet flow pipes of the assembly are bayonetted, first, through an opening in one wall of a header having a fluid flow passage therein which is adapted to freely drain at one edge of the opening, and thence through a pair of apertures in a second wall of the header on the opposing side of the passage from the opening, to connect the cartridge with the second wall at the apertures. In addition, an elongated tubular housing is telescopically engaged about the cartridge, and one end of the housing is connected with the one wall of the header so that the housing free drains at the one edge of the opening therein. The baffles, meanwhile, are given areas, transverse the axis, of less than the area circumscribed by the housing, transverse the axis, so that a first fluid can be circulated through the housing in the direction of the header, between the respective pairs of tubes and baffles, while a second fluid is circulated in the circuit of the cartridge. In some of the presently preferred embodiments of the invention, the opening in the header is defined by a nipple on the one wall thereof, and the housing is telescopically engaged in the nipple. Moreover, in certain embodiments, the housing and the header are clamped together along the axis of the cartridge, to prevent them from detaching from one another when the heat exchanger is under pressure. Typically, the housing and nipple are cylindrical in construction.

In many embodiments, a second header is provided at the opposing end of the housing, which has a fluid flow passage therein for the introduction of the first fluid to the housing. Furthermore, a filter is often provided in the fluid flow passage of the second header to remove debris from the first fluid before the fluid is introduced to the housing.

In one group of embodiments, the second header opens into the housing at an opening in one wall thereof, and has a second wall on the opposing side of the passage from the opening. An elongated rod is passed through the respective second walls of the respective headers, and through the housing, parallel to the axis of the cartridge, and means are provided on the opposing ends of the rod to clamp the resulting barrel assembly together as a sandwich. In addition, the filter is installed about the rod in the opening of the second header, and a hatch is provided on the second wall of the second header for clean out of the filter. In fact, the filter is often installed so as to be removable through the hatch.

The baffle-supported tube assembly of the cartridge is often formed by arranging the pluralities of tubes and baffles in tandem with one another along the axis, and then reciprocating the pluralities of tubes and baffles in relation to one another along the axis so that the tubes and baffles impale themselves on one another to form the assembly. To aid in the task, the baffles may have apertures therein which register with one another along the aforesaid parallels to the axis, and the tubes may be impaled in the apertures in forming the assembly. Additionally, the apertures may be undersized, relative to the diameters of the tubes, so that the tubes make interference fits with the baffles at the tenon and mortise joints therebetween.

In certain presently preferred embodiments of the invention, the pluralities of tubes and baffles are supported in a pair of spaced first and second racks, respectively, and the tubes are progressively cantilevered from the first rack in the direction of the second rack to impale the tubes in the bodies of the baffles. In some embodiments, moreover, the tubes are cantilevered from the first rack by a piston device which has the trailing ends of the tubes supported in sockets thereof.

Furthermore, in some embodiments, the racks and piston device are successively mounted in tandem along a parallel to the axis of the prospective assembly, and the tubes are supported lengthwise of the parallel in vertical first slots in the first rack, with a series of pins removably inserted across the slots between horizontal rows of the tubes, to space them apart and retain them on the first rack in guillotine fashion for displacement therefrom by the piston device, while the baffles are cradled crosswise of the parallel in vertical second slots in the second rack that are open ended to the first rack, lengthwise of the parallel, so that the tubes can be impaled through the second slots and baffles when they are displaced from the first rack by the piston device. The device itself is reciprocably mounted on a rail, parallel to the first slots, and has a third rack which is slotted in similar fashion to the first rack, and equipped with a second set of pins for retaining the tubes in guillotine fashion thereon. A reciprocable ram is abutable with the third rack to cooperate with the slots and pins thereof in forming the sockets for the trailing ends of the tubes, and to drive the third rack in the direction of the first and second racks for purposes of impaling the tubes in the baffles.

BRIEF DESCRIPTION OF THE DRAWINGS

These features will be better understood by reference to the accompanying drawings which illustrate a four barrel device for chilling a debris-laden liquid such as seawater, and in addition, a method for making the chiller device, including the individual barrel assemblies of the same, the refrigerant cartridges used therein, and the respective baffle-supported tube assemblies of the cartridges.

In the drawings:

FIG. 2 is a part elevational view of the device as it is seen from the right hand or inflow end thereof;

FIG. 3 is a partially removed perspective view of an individual barrel assembly;

FIG. 4 is a cross sectional view of the barrel assembly along the line 4—4 of FIG. 3;

FIG. 5 is a cross sectional view of the barrel assembly along the line 5—5 of FIG. 3;

FIG. 6 is a cross sectional view of the barrel assembly along the line 6—6 of FIG. 3;

FIG. 7 is a part axial cross sectional view of the barrel assembly at the inflow end thereof;

FIG. 8 is an exploded view of the barrel assembly at the inflow end thereof;

FIG. 9 is an end elevational view of the barrel assembly at the outflow end thereof;

FIG. 10 is a side elevational view of the barrel assembly at the outflow end thereof.

FIG. 11 is an exploded view of the barrel assembly at the outflow end thereof;

FIG. 12 is a part cross sectional view of the barrel assembly at the outflow end thereof, and illustrating the juncture made between the header at that end and each of the inlet and outlet pipes of the refrigerant cartridge 4 which is incorporated in the barrel assembly;

FIG. 13 is a schematic view of the refrigerant flow system in the cartridge;

FIG. 14 is an exploded view of one of the distributors employed in the refrigerant flow system;

FIG. 15 is a perspective view of one of the return bends employed in the refrigerant flow system;

FIG. 16 is a side elevational view of an apparatus for making the baffle-supported tube assembly of the refrigerant cartridge, when the apparatus is in the initial set up stage of the manufacturing operation;

FIG. 17 is a similar view of the apparatus when it is in a later stage of the operation in which the baffle-supported tube assembly is completed and ready for removal from the apparatus;

FIG. 18 is a plan view of the apparatus in the initial set up stage;

FIG. 19 is a cross sectional view of the apparatus along the line 19—19 of FIG. 18;

FIG. 20 is a cross sectional view of the apparatus along the line 20—20 of FIG. 18;

FIG. 21 is a part perspective view of the apparatus in the initial set up stage thereof;

FIG. 23 is a part axial cross sectional view of the forward end of a tube in the aforementioned first rack of the apparatus in the initial set up stage.

BEST MODE FOR CARRYING OUT THE INVENTION

Figure 1:
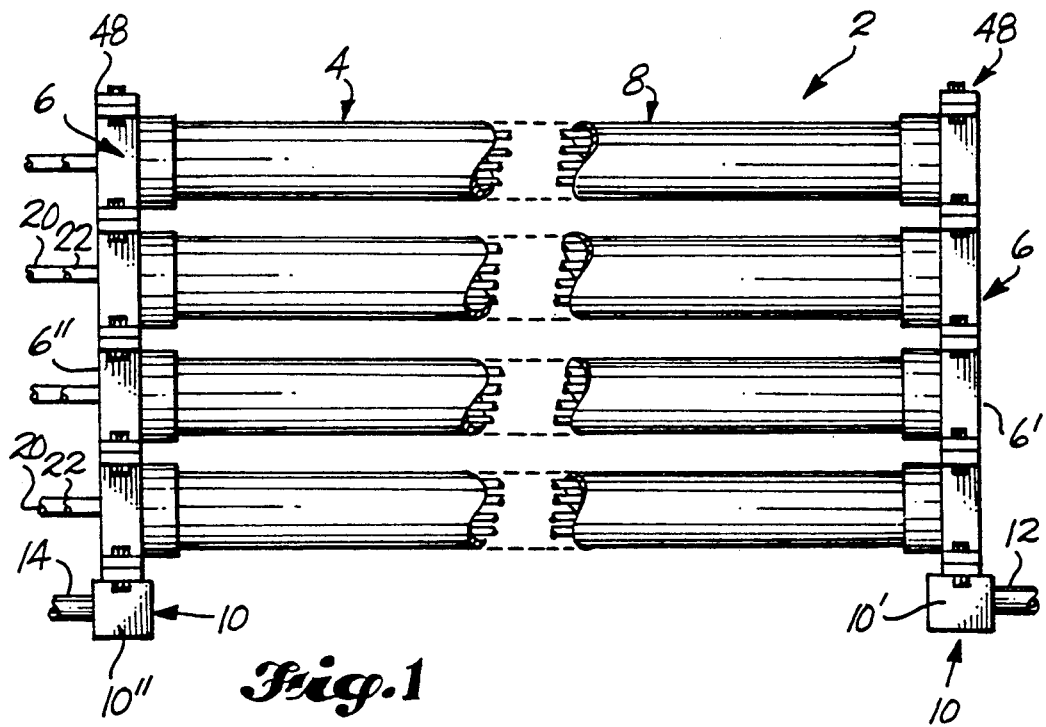
FIG. 1 is a full elevational view of the chiller device as it is seen from one side thereof.

Referring first to FIGS. 1-15, it will be seen that the chiller device 2 has the appearance of an upended grill 4 with columnar ends 6 and four cylindrical cross members 8 extending therebetween. The ends 6 are upstanding on a pair of pedestals 10 to serve as liquid flow manifolds for the cross members 8. The cross members 8 in turn serve as interconnecting conduits for the manifolds 6, and are commonly referred to as "chiller barrels" in that when liquid is pumped into the right hand manifold 6' at a nipple 12 on the pedestal 10 thereof, the liquid undergoes chilling as it flows through the conduits 8 to the discharge manifold 6", where it exits through a nipple 14 on the pedestal 10" thereof. The chilling operation is accomplished by a gallery of refrigerant pipes 16 (FIG. 13) that are installed in the respective conduits 8 and divided into four systems 18 of twenty four pipes each, serviced by pairs of inlet and outlet pipes 20 and 22, respectively, on the discharge manifold 6". In the conduits 8, the respective systems 18 of pipes are supported on series of baffles 24 (FIG. 3) which not only provide support for the systems, but also a means for causing the liquid to undergo serpentine flow through the respective conduits 8, as shall be explained. The flow is filtered, meanwhile, by additional baffles 26 (FIGS. 2 and 4) at the intake ends of the conduits, and these in turn are removable through a corresponding number of removable hatches 28 (FIG. 2) on the intake manifold 6', when it is desired to clean the device.

More specifically, the bodies 30 of the pedestals 10 are hollow chambered for upflow and downflow of liquid therethrough, and the "grill" 4 thereabove comprises four identical barrel assemblies 32 (FIG. 3) that are comprised in turn of individual chiller barrels 8 and pairs of headers 34 and 36 that are clamped to the ends of the barrels and adapted to form stackable sections of the respective manifolds 6. The headers 34, 36 have hollow, rectangular, open ended cases 38, with nipples 40 on the opposing sides thereof and rectangular flanges 42 on the open ends thereof. The flanges 42 have apertures 44 therein, and to form the device, the barrel assemblies 32 are stacked on top of one another and bolted together at the flanges 42 in the manner of FIGS. 1 and 2. In addition, the stack of assemblies is rested on the pedestals 10, and the lowermost assembly 32 is bolted to the pedestals at corresponding flanges 46 on the tops of the pedestals. Similarly flanged caps 48 (FIG. 1) are also added to the tops of the uppermost assembly 32, to close the manifolds 6 and force the liquid to circulate through the barrels.

The barrels 8 themselves are formed from elongated tubular housings 50 and a corresponding number of cartridge units 52 which are individually prefabricated and then telescopically inserted in the housings to provide the systems 18 of baffle-supported refrigerant pipes 16 for the respective barrels (FIG. 17). The barrels 8 are also equipped with filters 26 at the intake ends of the housings, and when the pairs of headers 34, 36 have been added to the barrels, elongated rods 54 are employed between the respective pairs of headers to clamp the barrels and headers together and secure the respective barrel assemblies 32 for use in the device 2.

Each cartridge unit 52 comprises a cluster of twentyfour spaced parallel tubes 56 (FIGS. 5 and 6) which are arranged about an axis 58 in a generally symmetrical pattern of vertical and horizontal rows 60 and 62, and impaled within the greater cylindrical outline of a series of chordally truncated discs 64 that are disposed in spaced parallel array along the axis 58, transverse thereof, to support the tubes 56 at tenon and mortise joints 66 therebetween. Corresponding ends 56' (FIG. 13) of the tubes 56 are interconnected by return bends 68, moreover, as are the ends 56" of certain tubes at the opposing end of the array, so that the cluster of tubes is formed into four reentrant flow circuits 70 (FIG. 13) for the refrigerant. Meanwhile, the eight remaining ends 56" of the tubes are interconnected with the inlet and outlet pipes 20 and 22 of the system 18, through a pair of distributors 72, so that four of the eight serve as the inflow ends of the circuits, and the other four serve as the outflow ends of the same. The discs 64 themselves are diametrically sized so that the cartridge unit 52 can be telescopically inserted in the housing 50; and the discs 64 are disposed, moreover, on alternated sides of the axis 58 from one disc to the next, with the truncated edges 74 of the same oppositely oriented to the axis, from disc to disc, so that when the cartridge unit 52 is incorporated in a barrel assembly 32 as a liquid flow conduit 8, the liquid undergoes serpentine flow in the same, from the intake header 34 to the discharge header 36 thereof. The discs 64 are also wider at the truncated edges 74 of the same than the radius of the housing 50, so that they occupy more than half the cross section of the barrel assembly, as seen, but they may be of any other width and configuration which is suited to the flow rate of the device.

When the headers 34 and 36 are added, the inner peripheries of the nipples 40 have annular rabbets 76 at the relatively outside edges thereof, within which the opposing ends of the housing 50 can be telescopically received; and when the housing is telescopically engaged in the rabbet 76 of the discharge header 36, the inlet and outlet pipes 20, 22 of the cartridge unit project sufficiently beyond the discharge end of the housing to be bayonetted through a pair of diametrically opposing openings 78 in the relatively outside wall 80 of the discharge header. The wall 80 of the header also has an axial opening 82 therein for the rod 54, and the openings 78 for the pipes 20, 22 are tapped and equipped with compression fittings 84, including O rings 86, with which to seal the pipes to the outside wall 80 of the header, as seen in FIG. 12. The intake header 34, meanwhile, has a circular opening 88 in the relatively outside wall 90 thereof that is axially opposed to the nipple 40 of the same, and of larger diameter than that of the nipple. The hatch 28 for the header 34 is also circular, and is cap screwed over the opening 88, with a hole 92 at its center to receive the opposing end 94 of the rod 54. The rod 54 is of sufficient length to run the length of the assembly 32, and is commonly threaded at the hatch-receiving end 94 thereof, and equipped with a head 96 at the other end. A nut 98 is employed on the threaded end 94 to draw up the assembly 32 and clamp the housing 50 between the headers 34, 36 at the nipples 40. Meanwhile, the inner periphery of the nipple 40 on the intake header 34 also has an annular rabbet 100 at the relatively inside edge thereof, and the filter 26 is in the form of a crenulated disc 102 that is adapted to seat in the rabbet 100, opposite the opening 88 of the hatch 28. The notches 103 in the disc 102 operate to pass the liquid when it is pumped into the device, but the disc 102 otherwise serves as an obstruction for major debris in the liquid. From time to time, however, the hatch 28 can be removed to access the filter 26, which as seen in FIG. 4, is apertured at 104 and secured in place by an additional nut 105 on the threaded end 94 of the rod 54. The nut 105 is removable to remove the filter 26 in turn when needed.

Preferably, the opening 82 for the head-bearing end of the rod 54 is countersunk to receive the head 96 of the rod. Also, the ends of the housing and the rabbets 76 of the nipples 40 have circumferential grooves 106 and 107 therein, which oppose one another when the ends of the housing abut the shoulders of the rabbets; and O rings 108 are preferably interposed between the housing and the nipples at the grooves.

The distributors 72 (FIG. 14) each comprise a pair of telescopically engagable casing members 110 and 112, one of which, 110, has a funneled end 114 that is attachable to the respective inlet or outlet pipe 20, 22, and the other of which, 112, has four tentacle like ends 116 that are attachable to four of the tubes 56, as mentioned.

The return bends 68 (FIG. 15) are conventional Ushaped members with belled ends 118 that are attachable to the ends 56' or 56" of the tubes.

Commonly, the tubes 56, bends 68, distributor members 110, 112, and pipes 20, 22 are all copper, copper/nickel or other metallic tubing which can be soldered together in forming the refrigerant system 18. The baffles 24, on the other hand, may be plastic, instead of metal, and are commonly truncated polyethylene discs. The discs are commonly predrilled or otherwise apertured, moreover, to receive the tubes, but are commonly undersized so that the tubes 56 make interference fits with the same in the cartridge unit, as shall be explained.

Figure 22:
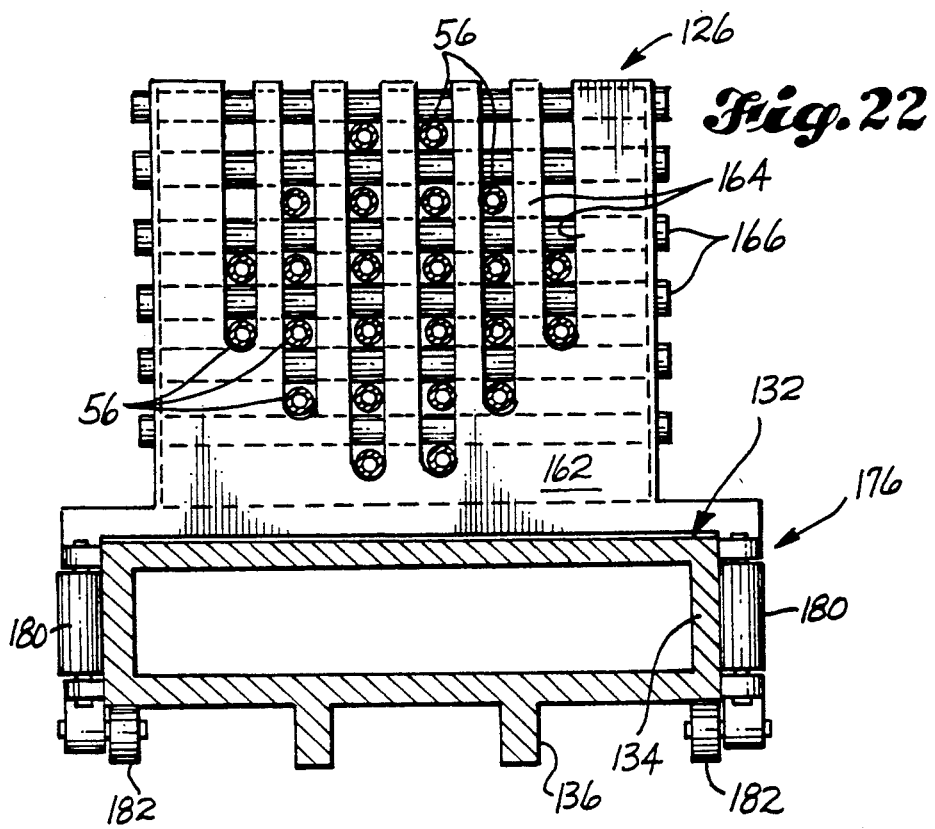
FIG. 22 is an end elevational view of the aforementioned first rack of the apparatus in the initial set up stage.

The apertures 120 of the baffles, like the tubes are arranged in rows, both vertically and horizontally of the respective baffles; and the baffle-supported tube assemblies 198 of the cartridge units 52 are prefabricated in an apparatus 122 in which the respective baffle and tube clusters are supported in tandem on a pair of racks 124 and 126, respectively, and then impaled on one another by a cooperating piston device 128 which is reciprocal in relation to the racks 124, 126. Referring now to FIGS. 16-23 in particular, it will be seen that each set of baffles 24 is predrilled or otherwise apertured at the sites 120 in which the tubes 56 are to be impaled in the same, and the leading ends of the tubes are equipped with bullet like inserts 130 (FIG. 23) which enable the tubes to be readily thrust through the apertures 120 of the baffles. The racks 124, 126 are supported on an elongated tubular rail 132 having a flat rectangular cross section at the top 134 thereof, and a supporting reduced diameter neck 136 therebelow. The rack 124 comprises a series of spaced parallel cradle sections 138 which are erected upright on one end portion of the rail 132, transverse the length thereof. Each cradle section 138 comprises a part annular saddle 140 which has a slightly greater than quarter circle swale 142 to the same, as well as an upstanding lip 144 at the relatively lower end of the swale, and a tangential extension 146 on the relatively upper end of the same. Each cradle section 138 also comprises a pair of grate-like end walls 148 and 150 which are disposed at the opposing ends of the saddle 14, transverse of the rail 132. One end wall, 148, comprises a series of four posts 152 which are upstanding on the rail 132 adjacent that end of the saddle 140 which is more remote from the rack 126, and spaced apart from one another so as to be operatively opposed to the lands 154 of the baffles 24 between the relatively vertical rows 156 of the apertures 120 therein. The other end wall, 150, comprises a pair of posts 158 which are upstanding adjacent the more proximate end of the saddle 140, relative to the rack 126, and are directly opposed to the relatively outside posts 152 of the end wall 148, in directions crosswise of the saddle 140. The respective cradle sections 138 are disposed, moreover, on the alternate sides of the rail 132, transverse thereof, and with the saddles 140 of the same oriented in opposite directions, crosswise of the rail, from one cradle section to the next. The slots 160 defined by the respective pairs of end walls 148, 150 are adapted to slidably receive the baffles 24; and the baffles are loaded into the cradle sections 138 by resting them on the saddles so that their truncated edges 74 abut the lips 144 of the saddles. In this condition, the apertures 120 of the respective baffles are aligned with one another, from one cradle section to the next, and moreover, are interposed between the posts 152 and 158 of the respective end walls 148 and 150 of the sections. This leaves the baffles exposed to the intrusion of the tubes 56 when the baffles and tubes are impaled on one another in a manner to be explained.

The rack 126 comprises a guillotine-like transom wall 162 which is upstanding on the relatively center portion of the rail 132, at a location spaced slightly to the rear of the first cradle section 138 of the rack 124. The wall 162 has six slots 164 therein, and the slots 164 are spaced apart from one another in those planes lengthwise of the rail which correspond to the vertical rows 60 of tubes 56 necessary to impale the vertical rows 156 of apertures 120 in the baffles. The slots 164 are also of varying depth, symmetrically of the center plane of the wall, so as to provide for stacking the tubes in the necessary horizontal rows 62 thereof, using a set of spacer pins 166 for this purpose. As seen, the wall 162 also has a series of holes 168 therein, crosswise of the rail 132, and the holes 168 extend from end to end of the wall at intervals corresponding to the spacing between the horizontal rows 62 of tubes 56, and the corresponding rows of apertures 120 in the baffles of the cartridge unit 52. The pins 166 are slidably insertable in the holes 168, for more than the full length thereof, and to assemble the cluster of tubes 56, a pair of the tubes is loaded in the deepermost slots 164, and then a pin 166 is inserted in the hole 168 thereabove to lightly clamp the tubes in place; whereafter four more tubes are added to the slots 164, and a second pin 166 is inserted in the next hole 168 to lightly clamp them in place. The process is continued until the full cluster of tubes is assembled in the wall 162 and the tubes are targeted on the corresponding apertures 120 of the baffles. The pins 166 are sufficiently loosely engaged in the holes 168, moreover, that the tubes can be cantilevered from the respective apertures 170 defined by the slots 164 and pins 166 when the baffle and tube clusters are impaled on one another, as shall be explained. Because of their loose engagement, the tubes 56 will also self align in the apertures 120 of the baffles, when they encounter the baffles in the impalement process, as shall also be explained.

Referring now to the right hand end of the rail 132, it will be seen that the piston device 128 takes the form of a second guillotine-like transom wall 172, which in this case, however, is erected upright on one end of a platform 174 to form a carriage 176 that is slidably supported on the top of the rail 132 for reciprocation in relation to the rack 126. The carriage 176 is reciprocably engaged on the rail, moreover, by an undercarriage 178 that is suspended below the carriage and equipped with rollers 180 and 182 for maintaining the wall 172 in an upright disposition on the rail as the carriage is reciprocated in relation to the rack 126. The undercarriage 178 comprises pairs of legs 184 which depend from the opposing sides of the platform 174 and have pairs of rollers 180 outriggered thereon at their vertical edges, as well as other pairs of rollers 182 projecting therebetween, under the overhang of the rail, at the bottoms of the legs. The latter rollers 182 effectively interengage the carriage 176 with the rail, vertically thereof, while the rollers 180 stabilize the carriage on the rail, horizontally thereof. The wall 172 is slotted and apertured in similar fashion to the wall 162, and an additional set of pins 166 is provided for insertion in the holes 186 of the wall 172, to lightly clamp the trailing end portions of the tubes 56 in the slots 188 of the wall at the levels of the apertures 120 in the baffles 24. In this way, when the forward ends of the tubes 56 are loaded in the wall 162, the trailing ends of the tubes can be loaded in similar fashion in the wall 172, so that the tubes are supported in horizontal planes parallel to the rail and at locations which correspond with the apertures 120 of the baffles.

The piston device 128 also comprises a ram 190 which is powered by a double-acting hydraulic cylinder 192 at the backside thereof. The ram 190 is articulated with respect to the drive rod 194 of the cylinder, and is slidably supported on the platform 174 so as to be engagable with the backside of the wall 172. When engaged with that side, the ram 190 effectively converts the apertures 196 between the pins 166 and slots 188 of the wall 172, to sockets in which the trailing ends of the tubes 56 are captured while the tubes are progressively cantilevered from the wall 162 by the ram.

When the impalement operation is to be conducted, the baffles 24 are loaded into the cradle sections 138 of the rack 124, and the tubes 56 are loaded into the slots 164 and 188 of the walls 162 and 172, with the sets of pins 166 interposed between the respective rows 62 thereof. The ram 190 is then engaged with the backside of the wall 172, and the wall is advanced toward the wall 162 of the rack 126, to progressively cantilever the tubes from the frontside of the wall 162 in the direction of the rack 124. As the ram continues its advance, the tubes are bayonetted through the apertures 120 of the respective baffles 24, from one cradle section 138 to the next, until all of the baffles are interconnected by the tubes. This may be accomplished in a single operation in which the entire cluster of tubes is advanced at one time and interconnected with the set of baffles in one step, or it may be accomplished in two or more operations in which certain of the tubes are advanced, and then others in turn until the entire cluster has been bayonetted through the set of baffles. As indicated earlier, moreover, the apertures 120 in the baffles are sufficiently undersized relative to the tube diameters, to assure that the tubes make interference fits with the baffles as tenon and mortise joints 66 are formed therebetween. In this way, the resulting baffle-supported tube assembly 198 is ready for use when the bayonetting operation is completed, and it is only necessary to remove the pins 166 from the walls 162, 172 to enable the trailing end portions of the tubes to be released, and thus the assembly 198 as a whole to be freed from the walls 162, 172. The ram 190 is then retracted from the rack 126 to prepare the apparatus 122 for a further operation.

At this time, moreover, the bullet-like inserts 130 are removed from the tubes, and the return bends 68 and distributors 72 are soldered or otherwise interconnected with the tubes to form the circuits 70 and to interconnect the circuits with the inlet and outlet pipes 20,22. The resulting cartridge unit 132 is then telescopically engaged in a housing 50, and the resulting barrel 8 is engaged with a discharge header 36, by telescoping the housing in the rabbet 76 of the nipple 40 of the same, as the pair of inlet and outlet pipes bayonettes through the openings 78 in the outside wall 80 of the header. Or in the alternative, the cartridge unit 132 is bayonetted through the openings 78, and then the housing 50 is sleeved about the unit and telescoped to the header 36. In either event, the compression fittings 84 are added to the pipes, and a rod 54 is inserted through the opening 82 of the header 36 and projected for the length of the barrel 8 through openings 200 in the respective baffles 24. This leaves the barrel 8 ready for the addition of an intake header 34, which is sleeved in turn over the opposing end of the housing at the nipple 40 thereof, while the threaded end of the rod is projected through the opening 88 of the header 34, and possibly through the hole 92 of the hatch 28 thereof as well, if the hatch is included with the header. At this time, moreover, a filter 26 is added to the rod, and a locknut 105 is used to anchor it to the housing; or the filter may be added at a later time, through the hatch in a subsequent step, when the barrel assembly 32 is completed and clamped together using the nut 98. To complete the device 2 as a whole, then, only the final step remains of stacking the respective barrel assemblies 322 and securing them to one another, and to the pedestals 10, as was explained earlier.

Commonly, the top 134 of the rail 132 is greased or otherwise prepared for the impalement operation, before the apparatus 122 is put to use.

I claim:

1. In a fluid heat exchanger, a header box having relatively opposing first and second sidewalls, a top, a bottom, and first and second openings in the first sidewall and one of the top, bottom and remaining sidewalls, respectively, an elongated open ended tubular housing having the longitudinal axis thereof passing through the first opening in the box, and an open end portion thereof connected to the first sidewall of the box at the first opening therein to form a barrel in which to circulate a first fluid through the heat exchanger to or from the second opening of the box, and a fluid flow cartridge for circulating a second fluid in heat transfer relationship with the first fluid in the barrel, said cartridge having a centerline operatively coinciding with the longitudinal axis of the housing and comprising a series of plate-like baffles operatively telescopically engaged in the housing in spaced parallel array with one another transverse the axis of the housing so as to permit the first fluid to circulate in the housing longitudinally thereof, and having openings therein which register with one another along lines substantially parallel to the axis of the housing, and a series of tubes telescopically engaged in the openings of the baffles along the aforesaid lines and interconnected with one another in a reentrant flow circuit having generally parallel inlet and outlet flow pipes at one end portion of the cartridge adjacent the header box, said second sidewall of the header box having a pair of spaced apertures therein operatively disposed opposite the first opening in the box, the inlet and outlet flow pipes of the one end portion of the cartridge being connected in fluid tight manner to the second sidewall of the box at the apertures therein, the cartridge operatively projecting from the second sidewall of the box through the first opening of the box into the housing, and the open end portion of the housing being inserted within the first opening of the box and connected in fluid tight manner to the first sidewall of the box so that the cartridge is operatively supported on the box when projected from the second sidewall thereof in the housing.

2. The fluid heat exchanger according to claim 1 wherein the first sidewall of the box has an annular nipple thereon, at the outside of the box, the nipple surrounds the first opening of the box, and the open end portion of the housing is telescopically engaged in the nipple.

3. The fluid heat exchanger according to claim 2 wherein a sealant ring is interposed between the open end portion of the housing and the nipple.

4. The fluid heat exchanger according to claim 2 wherein the housing and the baffles have cylindrical surfaces of revolution thereon at the inner and outer peripheries thereof, respectively, and the nipple and the housing have cylindrical surfaces of revolution thereon at the inner and outer peripheries thereof, respectively.

5. The fluid heat exchanger according to claim 4 wherein the baffles are truncated discs and are arranged in staggered relationship to one another on opposing sides of the centerline of the cartridge to generate serpentine flow in the housing when the first fluid circulates therein.

6. The fluid heat exchanger according to claim 1 wherein the tubes have interference fits with the baffles at the openings therein.

7. The fluid heat exchanger according to claim 1 wherein the series of baffles is sufficiently elongated that the cartridge is substantially coextensive with the housing longitudinally thereof.

8. The fluid heat exchanger according to claim 1 wherein the inlet and outlet flow pipes of the one end portion of the cartridge are inserted in the apertures in the second sidewall of the box, and are connected to the second sidewall of the box by compression fittings.

9. The fluid heat exchanger according to claim 1 wherein the second sidewall of the box is an integral portion of the box.

10. The fluid heat exchanger according to claim 1 further comprising a second header box of the same type, and wherein the housing is also open ended at the opposing end portion thereof, and the opposing open end portion of the housing is connected to the first sidewall of the second header box at the first opening therein to enable the first fluid to be circulated between the aforesaid first and second mentioned header boxes when the second fluid is circulated in heat transfer relationship therewith in the cartridge.

11. The fluid heat exchanger according to claim 10 wherein the first fluid is operatively circulated through the barrel in the direction relatively toward the first mentioned header box from the second header box, and the heat exchanger further comprises a strainer inserted in the opposing open end portion of the housing to filter the first fluid before it is circulated through the barrel in the direction of the first mentioned header box.

12. The fluid heat exchanger according to claim 11 wherein the second sidewall of the second header box has a third opening therein opposite the first opening of the second header box, and a removable hatch connected therewith for covering the third opening, and wherein the strainer is supported in the opposing open end portion of the housing so as to be removable through the third opening of the second header box when the hatch is removed therefrom.

13. The fluid heat exchanger according to claim 10 further comprising means operatively clamping the barrel and the first and second mentioned header boxes to one another along a line parallel to the longitudinal axis of the housing.

14. The fluid heat exchanger according to claim 13 wherein the clamping means include a bolt passed through the barrel and header boxes parallel to the longitudinal axis of the housing.

15. The fluid heat exchanger according to claim 10 further comprising pairs of the aforesaid first and second mentioned header boxes, with barrels supported therebetween, stacked on top of one another with the second openings of the respective pairs of header boxes intercommunicating with one another to form a grill-like structure having columnar manifolds at its ends and a series of spaced parallel heat exchanger barrels therebetween.

16. The fluid heat exchanger according to claim 15 further comprising means clamping the columnar manifolds to one another along lines parallel to the heat exchanger barrels therebetween.

17. The fluid heat exchanger according to claim 1 further comprising means clamping the barrel and the header box to one another along a line parallel to the longitudinal axis of the housing.

18. The fluid heat exchanger according to claim 17 wherein the clamping means include a bolt passed through the barrel and header box parallel to the longitudinal axis of the housing.

19. In a barrel-type fluid heat exchanger,
means defining a conduit for fluid,
said conduit having a bottom and an opening in one side thereof above the bottom,
an elongated open ended tubular housing having the longitudinal axis thereof passing through the opening in the one side of the conduit, and an open end portion thereof connected to the conduit at the opening to form a barrel in which to circulate a first fluid through the heat exchanger to or from the conduit,
a fluid flow cartridge for circulating a second fluid in heat transfer relationship with the first fluid in the barrel, and
fluid circulating means for circulating the second fluid in the cartridge,
said cartridge having a centerline coinciding with the longitudinal axis of the housing and comprising a series of plate-like baffles telescopically engaged in the housing in spaced parallel array with one another transverse the axis of the housing so as to permit the first fluid to circulate in the housing longitudinally thereof, and having openings therein which register with one another along lines substantially parallel to the axis of the housing, and a series of tubes telescopically engaged in the openings of the baffles along the aforesaid lines and interconnected with one another in a reentrant flow circuit having an inlet and an outlet at one end portion of the cartridge,
the one end portion of the cartridge being disposed adjacent the opening in the one side of the conduit,
the fluid circulating means including a pair of pipes passing through the conduit and interconnected with the inlet and outlet of the cartridge to supply the second fluid to and withdraw the second fluid from the cartridge, respectively, and
the open end portion of the housing being inserted within the opening in the one side of the conduit and connected in fluid tight manner to the conduit so that the barrel is self-draining into the conduit at the opening therein.

20. The barrel-type fluid heat exchanger according to claim 19 wherein a sealant ring is interposed between the open end portion of the housing and the opening in the one side of the conduit.

21. The barrel-type fluid heat exchanger according to claim 19 wherein the housing and the baffles have cylindrical surfaces of revolution thereon at the inner and outer peripheries thereof, respectively, and the opening in the one side of the conduit and the housing have cylindrical surfaces of revolution thereon at the inner and outer peripheries thereof, respectively.

22. The barrel-type fluid heat exchanger according to claim 21 wherein the baffles are truncated discs and are arranged in staggered relationship to one another on opposing sides of the centerline of the cartridge to generate serpentine flow in the housing when the first fluid circulates therein.

23. The barrel-type fluid heat exchanger according to claim 19 further comprising means defining a second conduit of the same type, and wherein the housing is also open ended at the opposing end portion thereof, and the opposing open end portion of the housing is connected to the second conduit at the opening in the one side thereof to enable the first fluid to be circulated between the aforesaid first and second mentioned conduits when the second fluid is circulated in heat transfer relationship therewith in the cartridge.

24. The barrel-type fluid heat exchanger according to claim 23 further comprising means clamping the barrel and the first and second mentioned conduits to one another along a line parallel to the longitudinal axis of the housing.

25. The barrel-type fluid heat exchanger according to claim 24 wherein the clamping means include a bolt passed through the barrel and the conduits parallel to the longitudinal axis of the housing.

* * * * *